United States Patent Office 2,840,126
Patented June 24, 1958

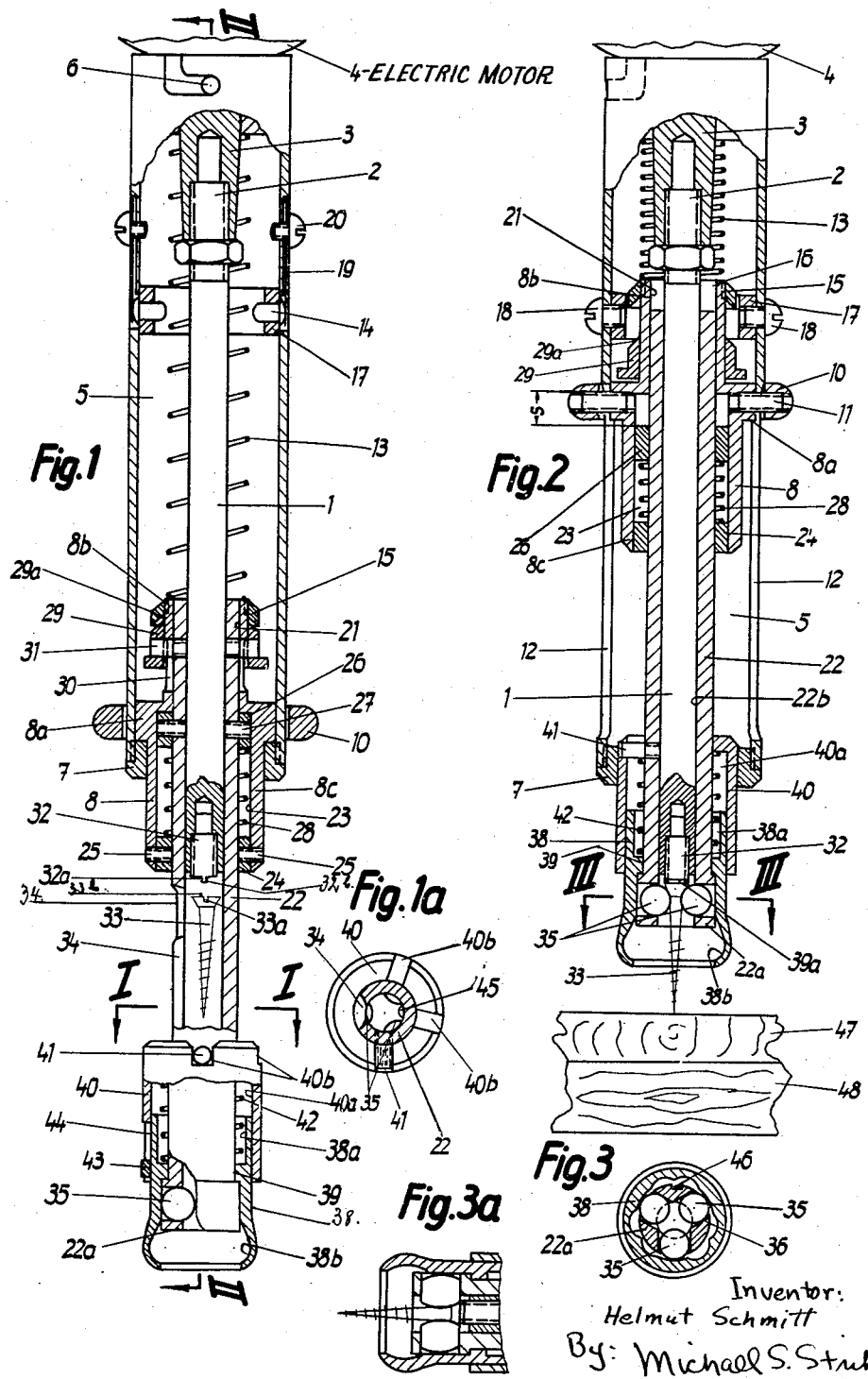

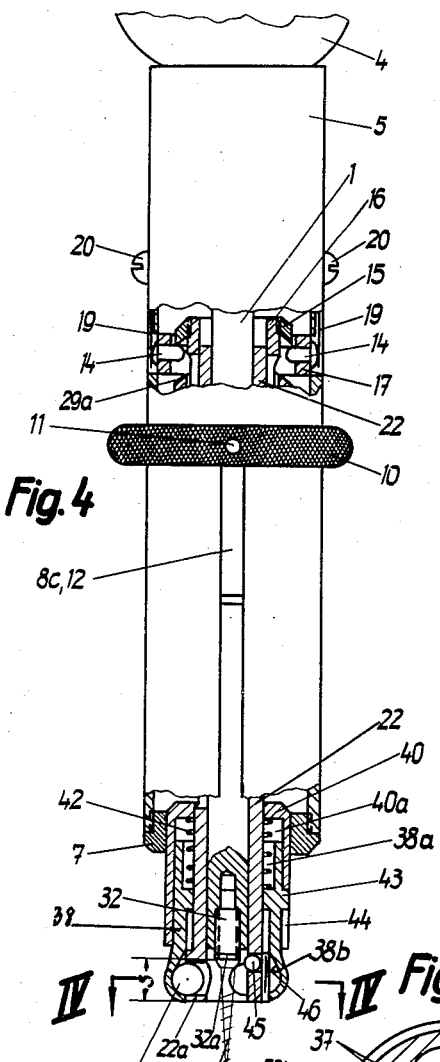
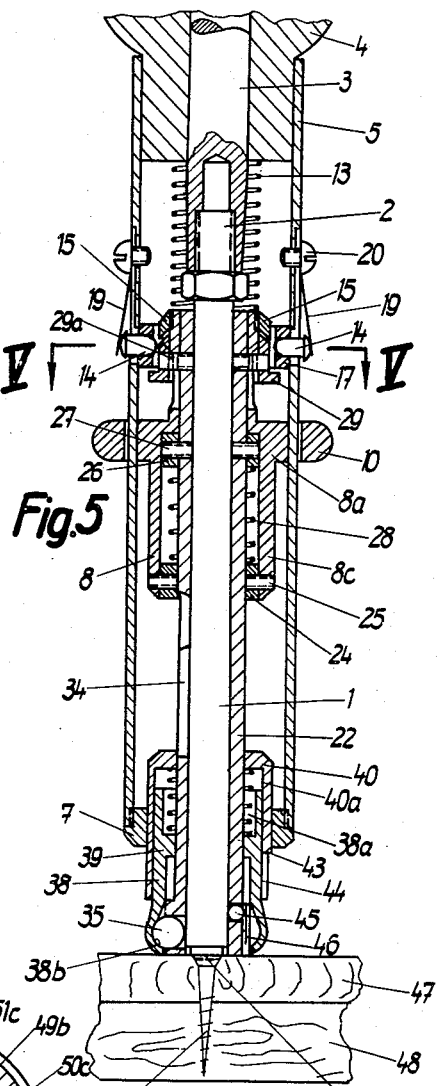
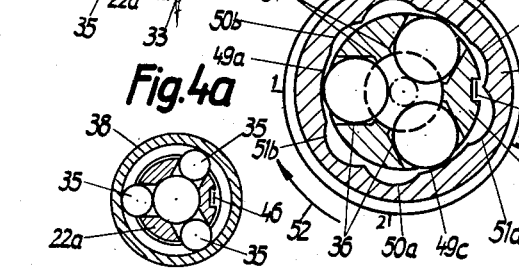

2,840,126
POWER OPERATED AUTOMATIC SCREW DRIVER
Helmut Schmitt, Altenseelbach Kreis Siegen, Germany
Application December 2, 1955, Serial No. 550,802
Claims priority, application Germany December 6, 1954
4 Claims. (Cl. 144—32)

The present invention relates to automatic screw drivers.

More particularly, the present invention relates to automatic screw drivers which are motor driven and adapted to hold a screw and automatically drive the same through a pair of elements which are to be joined to each other.

One of the objects of the present invention is to provide an automatic screw driver which is capable of centering and guiding the screw to be driven.

Another object of the present invention is to provide an automatic screw driver which is adjustable so as to be capable of use with screws of different sizes.

A further object of the present invention is to provide an automatic screw driver which is particularly suitable for driving wood screws or the like.

An additional object of the present invention is to provide an automatic screw driver which is automatically operable from a rest position through all stages of the operation and back to the rest position of the screw driver.

Also, the objects of the present invention include the provision of a structure capable of accomplishing the above objects and at the same time being composed of simple and ruggedly constructed elements which are very reliable in operation.

With the above objects in view the present invention mainly consists of an automatic screw driver which includes a support means and a first guide means for resiliently engaging the top face of a head of a screw to be driven. A second guide means is carried by the support means for engaging the shank and the underside of a head of a screw to be driven, this second guide means cooperating with the first guide means for centering as well as guiding the screw to be driven.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary sectional elevational view of an automatic screw driver constructed according to the present invention;

Fig. 1a is a sectional plan view taken along line I—I of Fig. 1 in the direction of the arrows;

Fig. 2 is a longitudinal sectional view of the structure taken along line II—II of Fig. 1 in the direction of the arrows and showing the parts of Fig. 1 in a different position;

Fig. 3 is a sectional plan view taken along line III—III of Fig. 2 in the direction of the arrows;

Fig. 3a is a fragmentary sectional view of the bottom end portion of the automatic screw driver and shows a different embodiment of screw engaging elements;

Fig. 4 is an elevational, fragmentary, partly sectional view of the structure of Figs. 1 and 2 in a position between the beginning and the end of the operation of the automatic screw driver;

Fig. 4a is a sectional plan view taken along line IV—IV of Fig. 4 in the direction of the arrows;

Fig. 5 is a sectional elevational view showing the position of the parts at the end of the screw driving operation;

Fig. 5a is a sectional plan view taken along line V—V of Fig. 5 in the direction of the arrows; and Fig. 6 is a sectional view showing the structure of Fig. 3 on an enlarged scale.

Referring now to the drawings, and to Figs. 1 and 2 in particular, it will be seen that the structure of the invention includes an elongated means 1 in the form of a drive spindle. The drive spindle 1 has a top threaded end 2, as viewed in Fig. 1, which is fixedly connected to the drive shaft 3 of the electric motor 4 which may be connected to any suitable source of current and which may be turned on and off with any suitable switch.

An elongated tubular housing 5 is coaxial with the spindle 1 and is fixed removably as by the bayonet connection 6 to the motor 4. It will be noted that the spindle 1 is coaxial with and extends along the interior of the tubular housing 5, and furthermore the interconnection of spindle 1 and housing 5 with the motor 4 retains the spindle 1 and housing 5 at all times in a predetermined position with respect to each other.

A ring 7 is threadedly connected to the bottom open end of the tubular housing 5 to provide the latter with an inwardly extending annular flange, as is evident from Figs. 1 and 2, and an actuating sleeve 8 is coaxial with the housing 5 and the spindle 1 and is shiftable along the axis of the housing 5. This actuating sleeve 8 is provided intermediate its ends with an outwardly extending annular flange 8a which slidably engages the inner face of the housing 5. The actuating sleeve 8 is provided at its top end portion 8b with an outwardly extending ring 15 fixed to the actuating sleeve 8 as by being threaded thereon, and this ring 15 has an outer periphery of noncircular shape. The part of sleeve 8 which extends upwardly from its flange 8a, as viewed in Figs. 1 and 2, is formed with a pair of diametrically opposed axially extending slots 30, and the part 8c of the sleeve 8 which extends downwardly from the flange 8a has a larger inner diameter than the portion of the sleeve 8 which extends upwardly from its flange 8a, a shoulder being provided along the interior of the sleeve 8 at the place where the interior portions of different diameters join each other. At its bottom end, the sleeve 8 fixedly carries a ring 24 located in the interior of the sleeve 8 and fixed to the latter by a pair of set screws 25, or the like.

The elongated tubular housing 5 is provided with a pair of opposed axially extending slots 12, as shown in Fig. 2, and a pair of set screws 11 are threadedly connected to the flange 8a of sleeve 8 and respectively extend through the slots 12 to the exterior of the housing 5, as shown in Fig. 2. These set screws 11 are also threadedly connected to a ring 10 which surrounds the tubular housing 5 and which is thus accessable to the operator, so that the operator may manually engage the ring 10 to shift the latter along the housing 5 and in this way shift the actuating sleeve 8 together with the ring 10 along the housing 5.

A coil spring 13 is coiled about and spaced from the spindle 1, and this spring is also coiled about and spaced from the drive shaft 3 of the motor 4. The coil spring 13 engages with one end thereof the motor 4 and with the opposite end thereof the top end of the sleeve 8, as viewed in Fig. 1, so that the coil spring 13 urges the sleeve 8 to the rest position thereof, as shown in Fig. 1, where the flange 8a engages the ring 7, this ring 7 thus serving to determine the rest position of the actuating sleeve 8, and the coil spring 13 forming a resilient means for urging the sleeve 8 to its rest position. A ring 17 is fixed by means of screw 18 to the housing 5 in the interior thereof just below the drive shaft 3, as viewed in Fig. 2, and this ring 17 is formed with a pair of diametrically radial bores in which a pair of stop pins 14 (Fig.

1) are slidable. In the region of the ring 17 the housing 5 is formed with a pair of elongated recesses in which leaf springs 19 are respectively located and with a pair of openings through which the head ends of the pins 14 are accessible. A pair of screw members 20 fix the leaf springs 19, respectively, adjacent one end thereof to the housing 5, and the free ends of the leaf springs 19 engage the head ends of the stop pins 14 to urge the latter inwardly towards the axis of the tube 5, as is evident from Fig. 1. Thus, when the sleeve 8 is raised by moving the ring 10 upwardly along the tube 5, there will come a time when the ring 15 engages with its top beveled face the stop pins 14 to urge the latter outwardly against the influence of the springs 19 until the ring 15 is located just above the stop pins 14 in the position indicated in Fig. 2, and at this time stop pins 14 snap under the ring 15 to releasably retain the actuating sleeve 8 in the operating position thereof indicated in Fig. 2.

The structure of the present invention further includes an elongated guide sleeve 22 into which the spindle 1 slidably extends to provide between the spindle 1 and the sleeve 22 mutual guiding for axial movement, the sleeve 22 also guiding the spindle 1 during its rotational movement. The guide sleeve 22 is provided with an outer diameter corresponding to the inner diameter of the bore portion 21 of the part of sleeve 8 which extends upwardly from the flange 8a thereof, so that the guide sleeve 22 is slidably guided by this upper portion of the sleeve 8 for axial shifting movement.

The inner diameter of the ring 24 which is fixed by the screws 25 to the bottom end of sleeve 8 also corresponds to the outer diameter of the guide sleeve 22 so that the latter is also guided for axially shifting movement by the ring 24. Within the interior portion 23 of part 8c of the sleeve 8 is located a ring 26 which is fixed by set screws 27 to the guide sleeve 22, this ring 26 having an outer surface in slidable engagement with the inner surface of the portion 8c of the sleeve 8, so that the ring 26 is axially shiftable together with the guide sleeve 22 with respect to the sleeve 8. A coil spring 28 is located within the bore portion 23 of sleeve 8 about the guide sleeve 22 and engages with its opposite ends the rings 24 and 26, respectively, so as to urge these rings apart from each other, and the movement of these rings apart from each other is limited by the engagement of ring 26 with the shoulder in the interior of the sleeve 8 located at the junction between the interior portions of different diameter of the sleeve 8, as is evident from Fig. 1. Thus, the spring 28 in cooperation with rings 24 and 26 and the interior shoulder of sleeve 8 serve to determine the rest position of the guide sleeve 22 with respect to the sleeve 8.

A ring 29 having a top beveled face surrounds the sleeve 8 just beneath the ring 15, and the ring 29 is fixed to a pair of set screws 31 which respectively extend through the axial opposed slots 30 of the sleeve 8 into threaded engagement with the guide sleeve 22, as is evident from Fig. 1, so that the ring 29 is movable together with the guide sleeve 22 and with respect to the actuating sleeve 8. It will be noted that in the rest position of the parts shown in Fig. 1 the ring 29 is located immediately beneath the ring 15, and as will be apparent from the description which follows the top beveled face 29a (Fig. 2) of the ring 29 serves to engage the stop pins 14 for releasing the latter in order to release the ring 15.

A screw driver bit 32 is threadedly connected to the free end portion of the spindle 1 in the manner indicated in Figs. 1 and 2, and the bit 32 has at its bottom end a blade 32a provided with a flat bottom face 32b. The bit 32 is adapted to engage a screw 33 for driving the latter, this screw 33 having a top face 33b which is adapted to be engaged by the bottom face 32b of the blade 32a, and the screw 33 is provided in its top face with a slot 33a into which the blade 32a is adapted to enter. The guide sleeve 22 is formed along one side with an elongated opening 34 through which the screw 33 is inserted into the interior of the guide sleeve 22.

The guide sleeve 22 has at its lower end portion 22a a large outer diameter which provides the guide sleeve with a shoulder adjacent its bottom end, as indicated in Figs. 1 and 2, and this portion 22a of the guide sleeve 22 is formed with a plurality of radial bores 36 in which the ball members 35 are freely movable, respectively, toward and away from the axis of the sleeve 22. As is apparent from Figs. 3 and 6, three bores 36 are provided and are angularly spaced from each other by 120°, and the bores 36 terminate at the portions which house the ball members 35, respectively, short of the inner face of the sleeve 22 to provide the latter in its portion 22a with inwardly extending portions 37 indicated in Fig. 6 of a smaller diameter than the bores 36, so that these portions 37 permit only a limited movement of the ball members 35 toward the axis of the sleeve 22. Thus, the portions 37 prevent any one of the ball members 35 from falling into the interior of the sleeve 22.

The bottom end portion of the sleeve 22 is surrounded by an outer sleeve 40 and by a retaining sleeve 38 which is intermediate to sleeves 22 and 40. The retaining sleeve 38 is provided with an inwardly extending flange 39 which engages the shoulder adjacent the bottom end of the sleeve 22 to limit the downward movement of the retaining sleeve 38 with respect to the sleeve 22. As is apparent from Fig. 1, the retaining sleeve 38 covers the bores 36 to retain the ball members 35 respectively in the bores 36. Above the flange 39 the sleeve 38 is provided with an inner bore portion 38a of enlarged diameter into which a spring 42 extends, this spring being coiled about the sleeve 22 and engaging at its bottom end the flange 39. Furthermore, the retaining sleeve 38 is formed at its bottom end which extends beyond the sleeve 22 in the position indicated in Fig. 1 with a portion of enlarged inner diameter 38b for a purpose described below.

The spring 42 is also located in the interior hollow portion 40a of the sleeve 40 and engages with its top end the inwardly extending top annular flange of the sleeve 40, as indicated in Figs. 2, 4 and 5, this top flange of the sleeve 40 slidably engaging at its inner periphery the outer surface of the guide sleeve 22. The guide sleeve 22 has a pin 41 fixed to and extending radially from the latter, and this pin 41 extends into one of three notches 40b formed in the top face of the sleeve 40, as is shown most clearly in Fig. 1a. These notches 40b are angularly displaced from each other by approximately 80° for a purpose described below. The sleeve 40 is furthermore provided with an elongated notch 44 extending axially along the sleeve 40 from its bottom end, and a pin 43 is fixed to the sleeve 38 and extends into the notch 44 in the manner indicated in Fig. 1 so that in this way the sleeves 40 and 38 cannot turn with respect to each other but the sleeve 38 is axially shiftable upwardly into the sleeve 40 to a degree greater than that indicated in Fig. 1. It will be noticed that the upper movement of the sleeve 40 under the influence of the spring 42 is limited by engagement of the sleeve 40 with the pin 41.

The above described structure operates as follows:

The parts are shown in their rest position in Fig. 1. In this position the screw to be driven 33 is inserted into the guide sleeve 22 in the opening 34 therein, and this screw is free to fall down toward the ball members 35. It will be noticed that the inner diameter of the sleeve 22 is just slightly greater than the diameter of the head end of the screw 33, so that the bottom pointed end of the screw 33 necessarily becomes located at the ball members 35. With the screw member 33 thus inserted into the tube 22, the operator grasps the ring 10 and shifts the latter upwardly along the sleeve 5 toward the position indicated in Fig. 2. During the major part of this movement of the ring 10, the sleeve 8 moves with the ring 10 and the sleeve 22 and all of the parts carried thereby move together with the sleeve 8 because the spring 28 retains the sleeve 22 and the parts carried thereby in the position indicated in Fig. 1 with respect to the actuating sleeve 8. This movement of the parts into the housing 5 continues until the bit 32 engages the head end of the screw 33 and forces the latter between the ball members 35 until the shank of the screw 33 and the underside of its head end are engaged by the ball members 35, as indicated in Fig. 2. It should be noted that it is unnecessary to stop the motor 4 when inserting additional screws into the sleeve 22 to be driven by the automatic screw driver of the invention, so that the bit 32 and the spindle 1 may be continually rotating during this time. As the bit 32 which is thus rotating engages the screw 33, the bottom face 32b of blades 32a turns on the top face 32b of the screw 33 until the blade 32a becomes aligned with the slot 33a and enters into the latter in order to place the screw 33 into driving engagement with the bit 32. When the sleeve 22 has been moved in this manner into the sleeve 5 and along spindle 1 until the bit 32 locates the screw 33 in the position indicated in Fig. 2 with respect to the ball members 35, it is evident that the sleeve 22 can move no further into the housing 5 because the ball members 35 engage the inner surface of the retaining sleeve 38 and cannot move outwardly beyond the position indicated in Fig. 2 in order to permit the sleeve 22 to move to a greater distance into the housing 5. Thus, once this position of the parts is attained, the continued upward movement of the ring 10 together with the actuating sleeve 8 is carried out with respect to the guide sleeve 22, and thus the spring 28 becomes compressed, the shoulder in the interior of the sleeve 8 moves upwardly away from the ring 26, the release ring 29 remains stationary with the sleeve 22, and the ring 15 continues to move with the sleeve 8 to engage the stop pins 14 and urge the latter outwardly until they snap beneath the ring 15 to releasably retain the actuating sleeve 8 in its operating position indicated in Fig. 2. It will be noted from Fig. 2 that the sleeve 8 has been moved with respect to the sleeve 22 through a distance s which is shown in Fig. 2 between the ring 26 and the shoulder in the interior of the sleeve 8. Thus, sleeve 8 and sleeve 22 must move through this distance s with respect to each other to again resume their original positions with respect to each other.

Thus, when the actuating sleeve 8 has thus been manually moved to its operating position shown in Fig. 2, the screw member 33 is engaged both by the ball members 35 and the bit 32. The bit 32 together with the spindle 1 forms a first guide means for guiding the screw 33, and the ball members 35 form a second guide means in cooperation with the elements associated with the ball members 35, this second guide means engaging the shank of the screw 33 as well as the underside of its head end, in a manner indicated in Fig. 2. Thus, the screw 33 is not only guided for axial movement, but in addition it is positively centered because of the engagement of the ball members 35 with the shanks of the screw 33 and with the underside of its head end. It will be noted that in the position of the parts indicated in Fig. 2, the spring 28 urges the sleeve 8 downwardly against the stop pins 14 to act through the latter on the housing 5, so that the sleeve 8 is urged downwardly with respect to the housing 5, while at the same time the spring 28 engages the ring 26 to urge the sleeve 22 upwardly, and this upward force acting on the sleeve 22 is prevented from moving the sleeve 22 by engagement of the ball members 35 with the head end of the screw 33 so that the ball members 35 are in this way urged upwardly against the underside of the head end of the screw 33. Furthermore, the retaining sleeve 38 is urged downwardly by the spring 42, so that outward radial movement of the ball members 35 is resiliently prevented in the position of the parts indicated in Fig. 2 by the spring 42.

With the parts thus in the position indicated in Fig. 2 and with the motor operating, the rotating screw 33 may be placed with its pointed end by the operator at a designated position on the outer face of the workpiece 47 of wood or plastic, and with the parts in this position the screw 33 may be easily driven through the workpiece 47 to enter into the workpiece 48 in order to fix the workpieces 47 and 48 to each other. The first turns of the screw 33 very easily enter into the workpiece 47, and the driving of the screw 33 continues until the bottom end of the sleeve 38 engages the top face of the workpiece 47. At this time the driving of the screw continues, and at the same time the sleeve 38 remains in its position engaging the workpiece 47, while the remainder of the entire automatic screw driver moves downwardly with respect to the sleeve 38 so that the latter becomes located to an increase extent within the outer sleeve 40, the spring 42 being compressed during this part of the operation. This portion of the operation continues until the parts have the position indicated in Fig. 4 where the bottom end of the sleeve 22 also engages the workpiece 47, and the screw member 33 has of course been driven at this time to a greater extent into the work. It will be noted that in this position of the parts indicated in Fig. 4 the bit 32 need only travel through the axial distances in order to complete the driving of the screw, and this axial distance s indicated in Fig. 4 is equal to the axial distance s indicated in Fig. 2, so that the distance the screw is driven after the sleeve 22 engages the workpiece is equal to the distance that the sleeve 22 and sleeve 8 have been axially shifted with respect to each other when the sleeve 8 has been moved to its operating position.

Now the driving of the screw continues, and at this time the ball members 35 are surrounded by the portion 38b of retaining sleeve 38 which is of an enlarged diameter, so that the ball members 35 are free to move radially away from the axis of the sleeve 32, and the parts are so designed that the ball members 35 can move radially away from this axis through a distance sufficient to allow the drive spindle 1 to move downwardly between the ball members 35, and of course the bit 32 as well as the head end of the screw 33 can freely move through the ball members 35 at this time also. Thus, during this stage of the operation the spindle 1 moves downwardly within the guide sleeve 22 until it reaches the position indicated in Fig. 5 where the screw member 33 has been completely driven into the workpieces 47 and 48 to attach the same to each other. Thus, during the movement of the parts from the position of Fig. 4 to that of Fig. 5 the sleeve 22 as well as the sleeves 38 and 40 remain stationary, and the remaining parts of the structure move downwardly with respect to these sleeves. Thus, the spindle 1 together with the motor 4 and the housing 5 move downwardly, the ring 7 sliding along the exterior of the sleeve 40 which at this time is surrounded by the ring 7, the sleeve 40 of course having an outer diameter equal to the outer diameter of the portion of sleeve 8 beneath the flange 8a thereof. As the housing 5 together with the spindle 1 and motor 4 thus move downwardly, the stop pins 14 also move downwardly and the ring 15 also moves downwardly, and since the release ring 29 is fixed to the sleeve 22, this ring 29 remains stationary with the sleeve 22 at this time so that during this part of the operation the stop pins 14 together with the ring 15 gradually approach the ring 29. When the screw 33 has been completely driven, in the manner indicated in Fig. 5, the parts which move at this time have moved downwardly through the distance s indicated in Fig. 2, and thus the rings 15 and 29 have resumed their original position with respect to each other, and the sleeves 8 and 22 have also resumed their original position with respect to each other. Furthermore, the top beveled face of the ring 29 has engaged the pins 14 to move the latter outwardly to their release position, indicated in Fig. 5, so that when the automatic screw driver is lifted from the completely driven screw the spring 13 will expand to quickly and automatically return the parts to their position indicated in Fig. 1, the spring 42 also expanding to return the retaining sleeve 38 to its rest position also indicated in Fig. 1. Then, while the motor continues to operate another screw 33 is inserted into the sleeve 22, and the above operations are repeated, so that with the structure of the invention it is unnecessary to start and stop the motor for each screw.

As is indicated in Figs. 4 and 5, the sleeve 22 is provided adjacent its bottom end with a radial bore displaced axially from the bores 36 and accommodating a ball member 45 which is movable toward and away from the axis of the sleeve 22. The small ball member 45 is urged toward the axis of sleeve 22 by a leaf spring 46 fixed to the sleeve 22 in an axial groove formed in the outer face of the portion 22a of the sleeve 22, and a slight constriction at the inner end of the bore which accommodates the ball 45 prevents the latter from falling into the interior of the sleeve 22. This little ball member 45 serves to guide the head of the screw member 33 between the ball members 35.

The structure of the present invention is capable of operating with screws of different types and different sizes. Thus, as is indicated in Fig. 3a, instead of spherical ball members 35, the radial bores of the sleeve 22 may accommodate elongated rollers whose axes are parallel to the axes of the sleeve 22, each of these rollers having a central portion of a larger diameter than its opposite end portions, so that the rollers shown in Fig. 3a correspond more closely to the configuration of screw members of a given type than the ball members 35, and thus when using certain types of certain screw members the rollers of Fig. 3a may be preferred to the ball members 35.

In order to be able to use the structure with the screw members of different sizes, the arrangement shown most clearly in Fig. 6 is provided to accommodate screw shanks of different diameters. Thus, as is apparent from Fig. 6, the portion of the retaining sleeve 38 which covers the bores 36 in the rest position of sleeve 38 shown in Fig. 2 is formed with a plurality of axially extending recesses 49a–51c indicated in Fig. 6. Thus, it will be noted that in the position of the parts shown in Fig. 6 the ball members 35 are respectively in engagement with the recesses 49a, 49b, and 49c which have a smaller depth than the remaining recesses formed at the inner face of the sleeve 38. The three recesses 50a, 50b and 50c have a greater depth than the recesses 49a–49c, and the recesses 51a–51c have a greater depth than the recesses 50a–50c. Each of these three sets of recesses has its recess angularly displaced from each other by 120° so that depending upon the angular position of the sleeve 38 with respect to the sleeve 22, the ball members 35 will cooperate with a set of recesses of the same depth. By turning the sleeve 38 with respect to the sleeve 22 in the direction of arrow 52 of Fig. 6, for example, it is possible to locate the ball members in engagement with the recesses 51a–51c, and thus in this position of the parts the ball members when they engage the sleeve 38 will be located at a distance from the axis of sleeve 22 greater than that indicated in Fig. 6, and thus in this position of the parts a screw member of larger shank diameter may be accommodated in the device. By further turning of the sleeve 38 in the direction of arrow 52, it is possible to locate the ball members 35 respectively in alignment with the recesses 50a–50c, and in this position of the parts the ball members may engage the shank of a screw having a shank diameter between that shown in Fig. 6 and that of the screw member adapted to cooperate with ball members 35 when they are located in the recesses 51a–51c.

The manner in which the sleeve 38 is turned to accommodate the screw members of different sizes is believed to be evident from Fig. 1. Thus, the sleeve 38 is freely turnable with respect to the sleeve 22 but is prevented from turning with respect to the same by engagement of pin 43 in the notch 44 of sleeve 40 which in turn cannot turn with respect to the sleeve 22 because of the engagement of the pin 41 in one of the notches 40b. In order to change the angular position of the sleeve 38, it is only necessary to push the sleeve 40 downwardly, as viewed in Fig. 1, to compress the spring 42 and to move the sleeve 40 out of engagement with the pin 41, at which time the sleeve 40 can be turned together with the sleeve 38 to a different angular position and the pin 41 can be accommodated in another one of the recesses 40b indicated in Fig. 1a in order to retain the sleeve 38 in the angular position in which it has been set.

The screw members 33, instead of being manually inserted through the opening 34 into the sleeve 22, may be automatically inserted into the sleeve 22 through the opening 34 by the use of a suitable magazine, and the movement of the sleeve 22 with respect to the magazine automatically causes a screw to be placed in the sleeve 22 after each cycle of operation until the magazine is empty.

Furthermore, instead of ball members 35 for engaging the shank of the screws, it is possible to use jaw members which are properly profiled to center the screw shank while permitting the latter to rotate and which are connected through suitable levers with the relatively movable sleeves for providing the desired sequence of operations.

It should be noted that with the above described structure a screw of given length will always be driven automatically through a given depth. It is possible to drive screws of different lengths with the structure of the present invention to different depths simply by exchanging the screw driver bit 32 for a screw driver bit of a different length, and for this purpose the screw driver bit 32 is threadedly connected to the spindle 1 in a removable manner. Thus, by locating a screw driver bit 32 of a different length from that shown in the drawings in driving engagement with the spindle 1, the distance s will be changed and in this way a shorter or longer screw may be properly driven into a pair of workpieces in the above described manner.

It will be understood that each of the elements described above, or two or more together, may also find a useful application in other types of automatic screw drivers differing from the types described above.

While the invention has been illustrated and described as embodied in an automatic screw driver capable of centering a screw, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. In an automatic screw driver, in combination, an elongated inner sleeve for guiding in its interior a spindle for rotation and axial movement, said inner sleeve having an open free end portion formed with a plurality of radial bores distributed about the axis of said inner sleeve; a plurality of bodies respectively located in said bores for free radial movement toward and away from said axis of said inner sleeve; an outer sleeve substantially coaxial with said inner sleeve and through which said inner sleeve extends; an intermediate sleeve substantially coaxial with said inner and outer sleeves and located between said inner and outer sleeves; said intermediate sleeve engaging the outer surface of said inner sleeve and covering said radial bores thereof; spring means engaging said intermediate and outer sleeves for urging the same in opposite directions along said inner sleeve away from each other; and means engaging said intermediate and outer sleeves for limiting the movement thereof away from each other while permitting said intermediate sleeve to move along said inner sleeve to a greater extent into said outer sleeve.

2. In an automatic screw driver, in combination, an elongated inner sleeve adapted to guide in its interior an elongated drive spindle for axial and rotational movement, said inner sleeve having an open free end portion formed with a plurality of radial bores distributed about the axis of said inner sleeve; an outer sleeve substantially coaxial with said inner sleeve and through which said inner sleeve extends; an intermediate sleeve coaxial with said inner and outer sleeves and located between said inner and outer sleeves and covering said radial bores, said intermediate sleeve having inner axially extending channel portions of different depths into which ball members in said radial bores may extend in accordance with angular position of said intermediate sleeve with respect to said inner sleeve; resilient means engaging said intermediate and outer sleeves for urging the same along said inner sleeve apart from each other; and means engaging said intermediate and outer sleeves for limiting the movement of the same apart from each other while freeing said intermediate sleeve for movement to a greater extent into said outer sleeve.

3. In an automatic screw driver, in combination, an elongated tubular housing; drive means fixed to said housing; an elongated drive spindle operatively connected to said drive means to be driven thereby and extending along the axis of said tubular housing in the interior thereof, so that said spindle and housing remain in a given position with respect to each other; a driver bit connected to said spindle at a free end portion thereof; an elongated guide sleeve into which said spindle slidably extends for guiding said sleeve for axial shifting movement along said spindle and to be guided by said sleeve for rotational movement, said guide sleeve having a free open end portion formed with a plurality of radial bores distributed about the axis of said guide sleeve; a plurality of ball members respectively located in said bores for movement toward and away from the axis of said guide sleeve; a retaining sleeve carried by said guide sleeve for axial movement therealong, covering said bores for retaining portion of enlarged inner diameter extending beyond said said ball members in said bores, and having a free end guide sleeve and into which said ball members may move away from said axis of said guide sleeve when said end portion of enlarged inner diameter overlaps said bores; first resilient means yieldably positioning said retaining sleeve on said guide sleeve in a position where said free end portion of said retaining sleeve extends beyond said guide sleeve; an actuating sleeve carried by said housing in the interior thereof for axial movement along the same, said guide sleeve extending through said actuating sleeve; manually operable means engaging said actuating sleeve for shifting the same in said housing between a rest position and an operating position; releasable stop means carried by said housing for releasably retaining said actuating sleeve in its operating position; second resilient means engaging said actuating sleeve for urging the same to its rest position; and means interconnecting said actuating sleeve and guide sleeve for movement together along said spindle in the interior of said housing when said actuating sleeve is moved from its rest toward its operating position until said spindle engages the top face of the head end of a screw member and until the shank and underside of the head end of the screw member are engaged by said ball members after which said guide sleeve remains stationary with respect to said spindle and said actuating sleeve continues to move with respect to said guide sleeve to its operating position, said means interconnecting said guide sleeve and actuating sleeve then urging said guide sleeve and actuating sleeve with respect to each other back to their original position, whereby during driving of a screw said guide sleeve moves into said enlarged end of said retaining sleeve to release the said ball members for movement away from said axis to release a screw member for movement through said ball members and then said spindle moves axially along said guide sleeve to continue to guide the screw member while said spindle together with said housing and actuating sleeve move toward a position where said actuating sleeve approaches its original position with respect to said guide sleeve; and means carried by said guide sleeve for releasing said stop means when said guide sleeve and actuating sleeve have again reached their original position.

4. In an automatic screw driver, in combination, drive means; an elongated tubular housing fixed to said drive means; a drive spindle connected to said drive means to be driven thereby and extending axially along the interior of said tubular housing; a driver bit fixed to a free end portion of said spindle to be driven therewith; an elongated guide sleeve into which said spindle slidably extends, said guide sleeve having a free end portion formed with a plurality of radial bores; a plurality of ball members freely movable in said radial bores for movement toward and away from the axis of said guide sleeve; a retaining sleeve located about said guide sleeve for retaining said ball members in said bores and having a free end portion of enlarged diameter extending beyond said guide sleeve; spring means engaging said retaining sleeve for releasably retaining the latter in the position where its enlarged free end portion extends beyond said guide sleeve, so that when said guide sleeve moves into said enlarged free end portion of said retaining sleeve said ball members may move away from the axis of said guide sleeve; releasable stop means carried by said housing; an actuating sleeve freely shiftable in said housing and through which said guide sleeve extends, said actuating sleeve having a free end portion directed toward said releasable stop means to be engaged thereby for releasably retaining said actuating sleeve in an operating position; spring means acting on said actuating sleeve for moving the latter away from its operating position to a rest position; manually operable means engaging said actuating sleeve for moving the latter from said rest to said operating position thereof; spring means engaging said actuating sleeve and guide sleeve for maintaining the same in a predetermined position with respect to each other until said spindle engages a screw member which is also engaged by said ball members to prevent movement of said guide sleeve and spindle with respect to each other after which said actuating sleeve is moved beyond said predetermined position with respect to said guide sleeve into engagement with said releasable stop means; and release means carried by said guide sleeve for engaging said stop means for releasing the latter when said guide sleeve and actuating sleeve again assume their predetermined position with respect to each other.

References Cited in the file of this patent

UNITED STATES PATENTS

| | | |
|---|---|---|
| 1,889,330 | Humes et al. | Nov. 29, 1932 |
| 1,945,741 | Gray | Feb. 6, 1934 |
| 2,261,134 | Blair | Nov. 4, 1941 |
| 2,327,074 | Snyder | Aug. 17, 1943 |
| 2,373,992 | Billinghurst | Apr. 17, 1945 |
| 2,605,792 | Havener | Aug. 5, 1952 |
| 2,657,721 | Shaff | Nov. 3, 1953 |
| 2,658,538 | Kitterman | Nov. 10, 1953 |
| 2,670,770 | Potterton | Mar. 2, 1954 |

FOREIGN PATENTS

| | | |
|---|---|---|
| 704,991 | Great Britain | Mar. 3, 1954 |